(12) United States Patent
Vergara et al.

(10) Patent No.: US 9,521,040 B2
(45) Date of Patent: Dec. 13, 2016

(54) SYSTEM AND METHOD FOR GENERIC CONFIGURATION MANAGEMENT SYSTEM APPLICATION PROGRAMMING INTERFACE

(71) Applicant: salesforce.com, inc., San Francisco, CA (US)

(72) Inventors: Jeaneth Vergara, Granite Bay, CA (US); Vivek Dodeja, Union City, CA (US)

(73) Assignee: salesforce.com, inc., San Francisco, CA (US)

( * ) Notice: Subject to any disclaimer, the term of this patent is extended or adjusted under 35 U.S.C. 154(b) by 217 days.

(21) Appl. No.: 14/244,555

(22) Filed: Apr. 3, 2014

(65) Prior Publication Data

US 2014/0304400 A1 Oct. 9, 2014

Related U.S. Application Data

(60) Provisional application No. 61/807,905, filed on Apr. 3, 2013.

(51) Int. Cl.
*H04L 12/24* (2006.01)

(52) U.S. Cl.
CPC ......... *H04L 41/082* (2013.01); *H04L 41/0856* (2013.01); *H04L 41/0866* (2013.01)

(58) Field of Classification Search
CPC .................................................. H04L 41/082
USPC ........ 709/223, 224, 226, 227; 717/126, 127, 717/131
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 6,092,083 A | 7/2000 | Brodersen et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec |
| 6,324,693 B1 | 11/2001 | Brodersen et al. |
| 6,336,137 B1 | 1/2002 | Lee et al. |
| D454,139 S | 3/2002 | Feldcamp |
| 6,367,077 B1 | 4/2002 | Brodersen et al. |
| 6,393,605 B1 | 5/2002 | Loomans |

(Continued)

OTHER PUBLICATIONS

"API Reference"—Ice Warp, Apr. 2012 http://dl.icewarp.com/documentation/server/API/V10%20API%20Reference.pdf.*

*Primary Examiner* — Randy Scott
(74) *Attorney, Agent, or Firm* — Blakely, Sokoloff, Taylor & Zafman

(57) ABSTRACT

The technology disclosed can query configuration management system data and includes cross table selection criteria and joined data return.

18 Claims, 5 Drawing Sheets

(56) References Cited

U.S. PATENT DOCUMENTS

| | | |
|---|---|---|
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker et al. |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,340,411 B2 | 3/2008 | Cook |
| 7,620,655 B2 | 11/2009 | Larsson et al. |
| 9,392,047 B1 * | 7/2016 | Santana .................. H04L 67/10 |
| 2001/0044791 A1 | 11/2001 | Richter et al. |
| 2002/0022986 A1 | 2/2002 | Coker et al. |
| 2002/0029161 A1 | 3/2002 | Brodersen et al. |
| 2002/0029376 A1 | 3/2002 | Ambrose et al. |
| 2002/0035577 A1 | 3/2002 | Brodersen et al. |
| 2002/0042264 A1 | 4/2002 | Kim |
| 2002/0042843 A1 | 4/2002 | Diec |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0152102 A1 | 10/2002 | Brodersen et al. |
| 2002/0161734 A1 | 10/2002 | Stauber et al. |
| 2002/0162090 A1 | 10/2002 | Parnell et al. |
| 2002/0165742 A1 | 11/2002 | Robins |
| 2003/0004971 A1 | 1/2003 | Gong et al. |
| 2003/0018705 A1 | 1/2003 | Chen et al. |
| 2003/0018830 A1 | 1/2003 | Chen et al. |
| 2003/0066031 A1 | 4/2003 | Laane |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker |
| 2003/0088545 A1 | 5/2003 | Subramaniam et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec |
| 2003/0189600 A1 | 10/2003 | Gune et al. |
| 2003/0191743 A1 | 10/2003 | Brodersen et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan, Jr. et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2005/0125461 A1 * | 6/2005 | Filz .......................... G06F 8/65 |
| 2010/0121821 A1 * | 5/2010 | Kinoshita .............. G06Q 30/06 |
| | | 707/661 |
| 2012/0167121 A1 * | 6/2012 | Reierson ................. G06F 9/541 |
| | | 719/328 |
| 2013/0019314 A1 * | 1/2013 | Ji ........................... H04L 67/02 |
| | | 726/25 |

* cited by examiner

SYSTEM AND METHOD FOR GENERIC CONFIGURATION MANAGEMENT SYSTEM APPLICATION PROGRAMMING INTERFACE

CLAIM OF PRIORITY

This United States patent application is related to, and claims priority to U.S. Provisional Patent Application No. 61/807,905 filed Apr. 3, 2013, entitled "SYSTEM AND METHOD FOR GENERIC CONTENT MANAGEMENT SYSTEM APPLICATION-PROGRAMMING INTERFACE,", the entire contents of which are incorporated herein by reference.

TECHNICAL FIELD

Embodiments relate to configuration management in a computing environment. More particularly, embodiments relate to interfaces for use with generic configuration management system.

BACKGROUND

Organizations typically employ many different types of software and computing technologies to meet their computing needs. However, installing and maintaining software on an organization's own computer systems may involve one or more drawbacks. For example, when software must be installed on computer systems within the organization, the installation process often requires significant time commitments, since organization personnel may need to separately access each computer. Once installed, the maintenance of such software typically requires significant additional resources. Each installation of the software may need to be separately monitored, upgraded, and/or maintained. Further, organization personnel may need to protect each installed piece of software against viruses and other malevolent code. Given the difficulties in updating and maintaining software installed on many different computer systems, it is common for software to become outdated. Also, the organization will likely need to ensure that the various software programs installed on each computer system are compatible. Compatibility problems are compounded by frequent upgrading, which may result in different versions of the same software being used at different computer systems in the same organization.

Accordingly, organizations increasingly prefer to use on-demand services accessible via the Internet rather than software installed on in-house computer systems. On-demand services, often termed "cloud computing" services, take advantage of increased network speeds and decreased network latency to provide shared resources, software, and information to computers and other devices upon request. Cloud computing typically involves over-the-Internet provision of dynamically scalable and often virtualized resources. Technological details can be abstracted from the users, who no longer have need for expertise in, or control over, the technology infrastructure "in the cloud" that supports them.

BRIEF DESCRIPTION OF THE DRAWINGS

The included drawings are for illustrative purposes and serve only to provide examples of possible structures and process operations for one or more implementations of this disclosure. These drawings in no way limit any changes in form and detail that may be made by one skilled in the art without departing from the spirit and scope of this disclosure. A more complete understanding of the subject matter may be derived by referring to the detailed description and claims when considered in conjunction with the following figures, wherein like reference numbers refer to similar elements throughout the figures.

DETAILED DESCRIPTION

Figure 1:
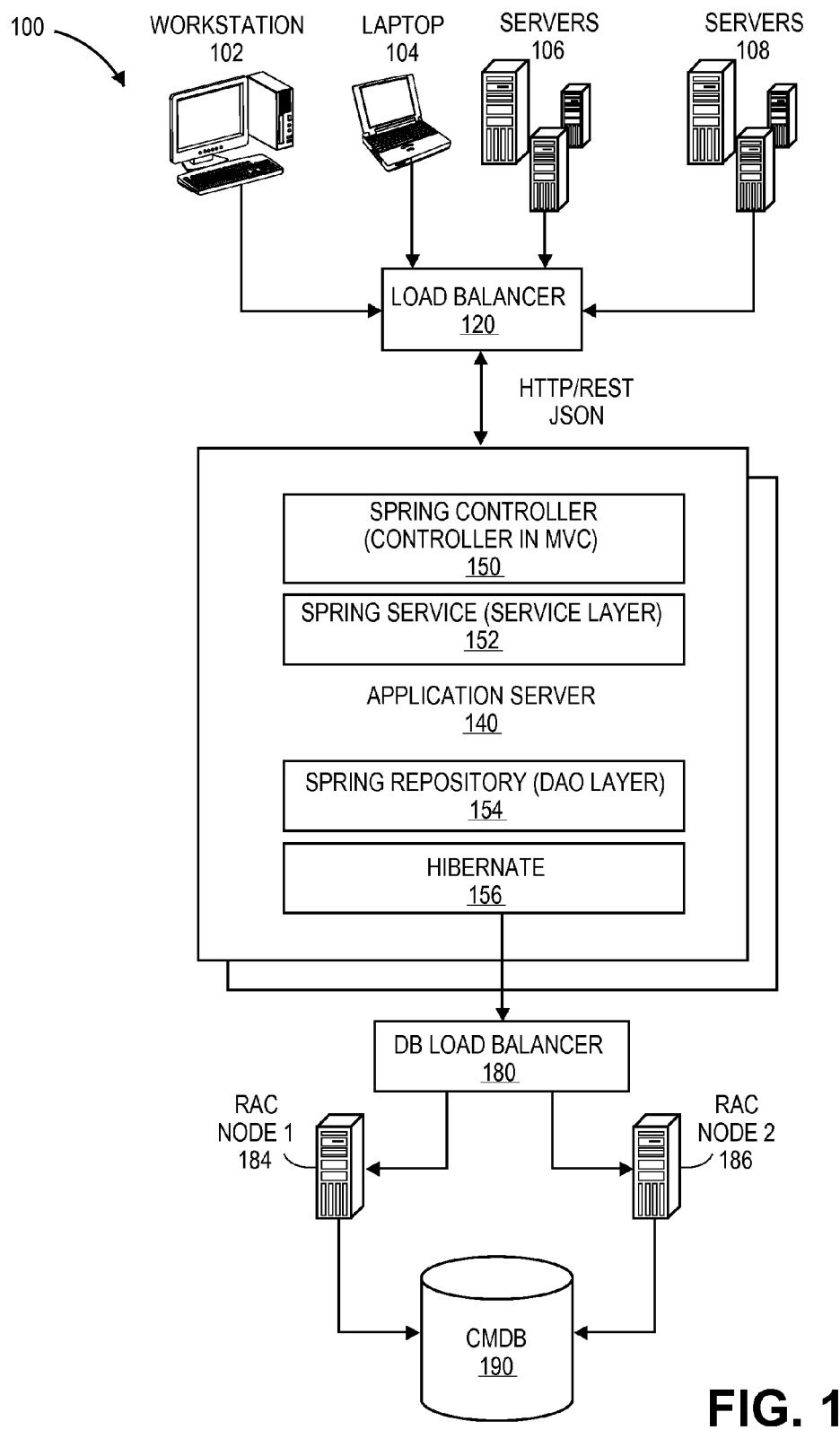
FIG. 1 is a block diagram of one embodiment of an architecture in which generic configuration management can be utilized.

In one embodiment, the technology disclosed can configuration management system data and includes cross table selection criteria and joined data return. Other aspects and advantages are illustrated in the drawings, the detailed description and the claims, which follow.

The following detailed description is made with reference to the figures. Sample implementations are described to illustrate the technology disclosed, not to limit its scope, which is defined by the claims. Those of ordinary skill in the art will recognize a variety of equivalent variations on the description that follows.

In one embodiment, the technology disclosed provides for both logical configuration and physical inventory. This allows for dynamic configuration hierarchies to be supported. Typical configuration management systems are flat with simple key-value pairs. The technology disclosed provides a more complex, dynamic hierarchy of configurations. For example, in a cloud provider environment, there can be different configurations for different data centers, SUPERPODS, PODS, other clusters, servers, networks, etc. Thus, the technology discloses provides configuration functionality for on demand service environments including, for example, multitenant database environments.

In one embodiment, the technology disclosed relates to generic configuration management system application programming interface (API) for use in a computer-implemented system. The described subject matter can be implemented in the context of any computer-implemented system, such as a software-based system, a database system, a multi-tenant environment, or the like. Moreover, the described subject matter can be implemented in connection with two or more separate and distinct computer-implemented systems that cooperate and communicate with one another. One or more implementations may be implemented in numerous ways, including as a process, an apparatus, a system, a device, a method, a computer readable medium such as a computer readable storage medium containing computer readable instructions or computer program code, or as a computer program product comprising a computer usable medium having a computer readable program code embodied therein.

In one embodiment, API version validation capability allows for additional configuration items to be added/removed/changed with support of multiple versions of these configurations. In one embodiment, this version validation capability automatically applies to all configuration items/resources that are added (e.g., via annotations) without having to implement versioning for each configuration item.

In one embodiment, support is provided for REST APIs for multiple resource in a generic manner by scanning and caching class metadata to build database queries and responses. This capability allows generation of REST API configuration systems (e.g., deployment configurations) and can be extended for use with non-configuration systems.

FIG. 1 is a block diagram of one embodiment of an architecture in which generic configuration management can be utilized. Architecture 100 can provide services to any number of remote electronic devices (e.g., workstation 102, laptop 104, servers 106 and/or servers 108). In one embodiment, the one or more electronic devices are coupled to communicate through load balancer 120, which may operate to balance the network traffic to and from the remote electronic devices.

In one embodiment, there is provided an interface between load balancer 120 and application server 140. In one embodiment, the interface is a HyperText Transfer Protocol (HTTP)/REST JSON (Representational State Transfer (REST) JavaScript Object Notation (JSON) interface. In alternate embodiments, other interfaces can also be supported. JSON is a light-weight data serialization format based on a subset of JavaScript. A RESTful interface is one that conforms to the constraints and characteristics of the REST architectural style.

In one embodiment, application server 140 also includes an interface to database load balancer 180. In one embodiment, database load balancer 180 is coupled with one or more real application cluster (RAC) nodes (e.g., 184, 186), which can access database 190. In one embodiment, database load balancer 180, RAC node 184, RAC node 186 and database 190 are part of a multitenant database environment. Various features and embodiments of multitenant database environments are described in greater detail below.

Application controller can include various components, for example, Spring Model View Controller (MVC), 150 and/or Spring Service 152, and/or Spring Repository 154. Other and/or different components may also be provided/utilized by application server 140. Spring is merely an example technology and others embodiments can also be supported. Hibernate layer 156 operates to integrate database functionality of the underlying database with JAVA-based functionality. Other technologies can also be used.

The technology disclosed herein can query configuration management system (CMS) data and includes cross table selection criteria and joined data return. It can further include bulk creation of rows in a single table, bulk update of rows in a single table, bulk deletion of row in a single table, cascading deletes through top level objects, creation of rows in multiple class types in a single call through top level objects, update rows in multiple class types in a single call through top level objects, pagination of "get" methods, etc.

In some implementations, it can include writing to non-CMS data sources, supporting federation to external sources including federating full tables to non-CMS data sources, selecting criteria that include non-CMS data sources, joining of columns from external sources logically into an object in the CMS to return column data from an external source. In other implementations, it can include data processes such as uniqueness, null allowed, and referential integrity. It can also include partial field/property updates of resources where user may pass only the fields that need to be updated and queries with "other than and" as the operator.

In one embodiment, the API can adhere to most or all of the REST API standards. The base URL on which the "create, read, update, delete" (CRUD) operations can be built may be, for example, {cms-server}/api/{version}/{resource}, where {resource} can represent a domain object. It can be used to abstract the REST API from the schema of the persistence layer. In some implementations, "{resource}" can be mapped to a domain object on one-to-one basis.

In some implementations, the API can be accessed using standard REST conventions. The API method can be modeled as a resource and invoked using one of the HTTP verbs: POST, GET, PUT, and DELETE. These HTTP verbs can directly correlate with the database CRUD operations.

In one embodiment, the resource associations can diverge from the REST standards because these associations can be added as part of the response like an object graph instead of hypertext links. Thus it can support: typed APIs or Java client bindings; updates from top-level objects; and/or partial updates.

In one embodiment, all CRUD operations can be performed through the main resources or top-level objects. For example, in FIG. 2, the Host 220, Cluster 225, SuperPod 230 and DataCenter 235 objects can be top-level objects, which can support the CRUD operations. In some implementations, read operations can also support various resources, including non-top-level objects. The top-level objects of FIG. 2 are example implementations and other implementations can also be supported.

Furthermore, top-level objects can be updated by modifications that can be specific to the top-level objects. For example, in FIG. 2, host and its related objects can be updated by specifying an update to the host object.

Figure 2:
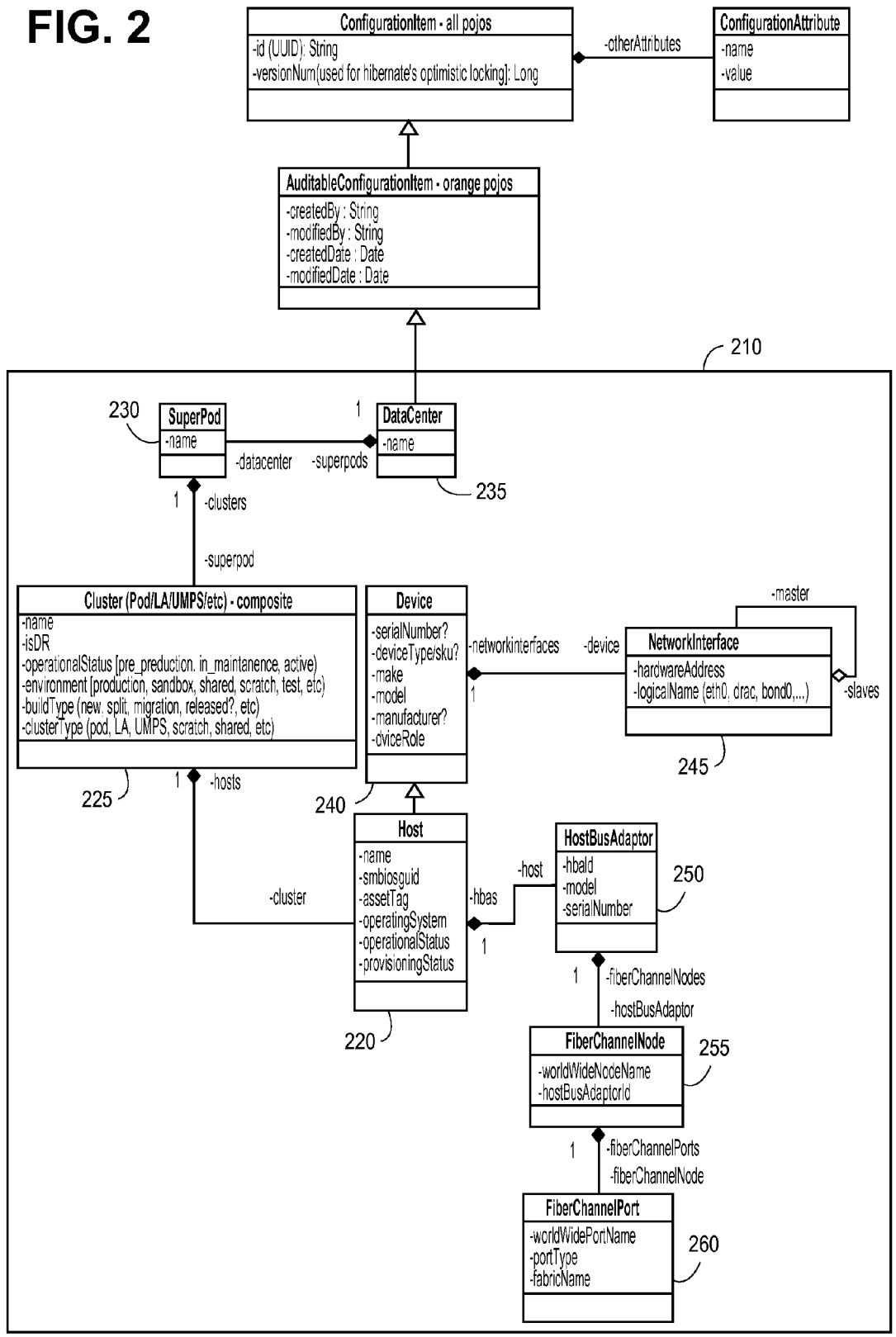
FIG. 2 is a block diagram of one embodiment of a computing environment in which generic configuration management can be utilized.

In some implementations, processes supported by architecture illustrated in FIG. 2 can include updating device object (i.e., updating the host objects with embedded device information). It can also include adding more network interfaces for the host (i.e., retrieving the host for update), then adding the new network interface to the host object and making an update API call to update the host. It can include deleting a network interface for the host (i.e. retrieving the host for update), deleting the interface object from the host and making an update API call to update the host. It can further include adding a host to a cluster, in which case the host can be related to the cluster and can make a "create API" call.

In one embodiment, exposed objects 210 are the exposed portion of the interfaces described herein. In one embodiment, exposed objects 210 includes the top-level objects (e.g., Host 220, Cluster 225, SuperPod 230, DataCenter 235) as well as Device 240, NetworkInterface 245, HostBusAdapter 250, FiberChannelNode 255, and FiberChannelPort 260. Exposed objects 210 provide an interface to one or more configuration objects that provide configuration functionality.

Figure 3:
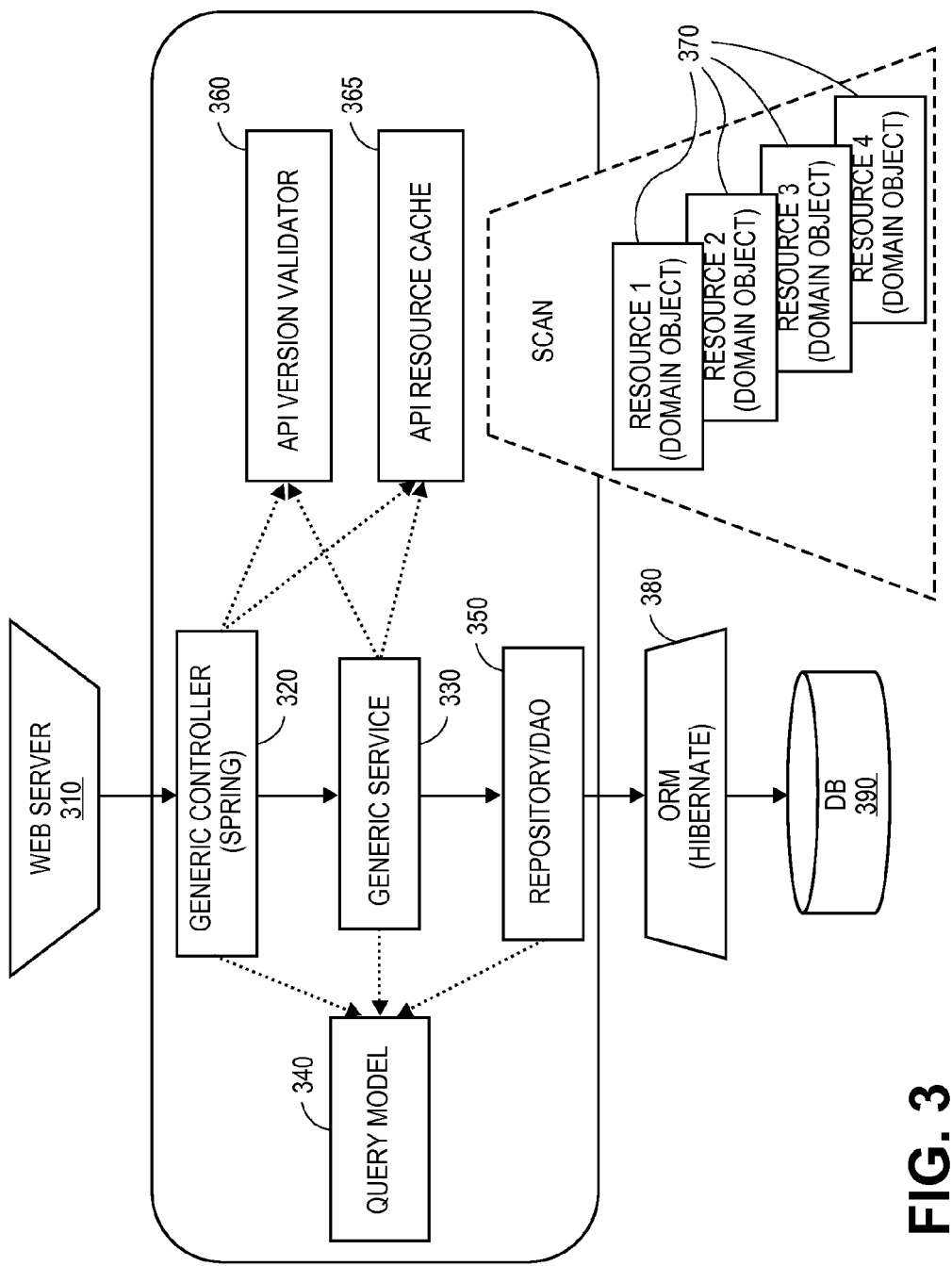
FIG. 3 is a conceptual diagram of one embodiment of a group of interfaces to support generic configuration management.

FIG. 3 is a block diagram of one embodiment of a computing environment in which generic configuration management can be utilized. The block diagram of FIG. 3 provides a lower-level description of the application server (e.g., application server 140 of FIG. 1) and the relevant components to provide generic configuration management.

Web server 310 is any type of web server that provides content to, or requests content from database 390. Some components (e.g., load balancers) are not illustrated in FIG. 3 in order to not distract from the description of the configuration management techniques utilized herein.

Generic controller 320 handles methods (e.g., CRUD, find, describe, list, distinc) for supported resources. In one embodiment, generic controller uses the Spring @RequestMapping annotation for each method to indicate the URL pattern to handle API requests in a generic manner. An API request can be matched to one of the URL patterns, the version can be validated and the request can be matched to its resource type (whether top-level or not). Once validations are successful, the request can be handed off to generic service layer 330.

In one embodiment, exceptions can be handled in a generic manner in this layer as well. The following is an example controller method for a delete.

```
/**
 * Delete resource;
 *
 * @param version        The version requested by the client
 * @param resourceType   type of resource to be deleted
 * @param id             the id of resource to be deleted
 */
@RequestMapping (produces = "application/json", value = "/{version:^[1-9] [0-
9]*\\.[0-9] [0-9]*$}/{resource}/{id}", method = RequestMethod.DELETE)
@Responsebody
public CMSResponse delete (@PathVariable("version") Double version,
@PathVariable ("resource") String resourceType, @PathVariable("id") String id)
{
    return deleteResource (version, resourceType, id);
}
private CMSResponse deleteResource(Double version, String resourceType,
String id) {
    CmsApiVersionHandler versionHandler = new CmsApiVersionHandler
(version);
    version Handler.verifyVersion(versionValidator);
    cmsService.delete(apiResourceCache.getClassName(resourceType), id);
    return new CMSSuccessResponse( );
}
```

In one embodiment, query model 340 stores the parsed request and is used by multiple modules for different purposes. In one embodiment, query model 340 is used by Repository/DAO layer 350 to dynamically generate a ORM (e.g., Hibernate) 380 query to find resources saved in database 390 for handling, for example, start, limit, search-Criteria and expand, etc. In one embodiment, query model 340 is used by generic controller layer 320 to parse JSON output fields and for handling the fields query parameter in the request.

In one embodiment, generic service layer 330 performs CRUD operations issued by controller 320. Depending on the operation requested by controller 320, generic service layer 330 performs the create, find, delete or update operation on the appropriate data in the repository. Generic service layer 330 then wraps the result of the operation and passes it back to controller 320. In one embodiment, generic service layer 330 uses the API resource cache 365 and/or API version validator 360 to perform the operation on the correct resource and version. The following is example code for delete:

```
Public void delete(String objectType, String id) {
    Logger.info("delete({ },{ }) called", objectType, id);
    If (objectType == null || id == null) {
       Logger.error("Exception during delete( )");
       Throw new
CmsRuntimeException(REQUIRED_PARAMETER_NOT_FOUND);
    }
ConfigurationItem configurationItem = get(new RequestQueryModel(objectType,
id));
If(configurationItem == null) {
   Logger.error("Excpetion during delete( )");
   Throw new
      ResourceNotFoundException
      String.format(CANNOT_FIND_ENTITY_WITH_ID,
apiResourceCache.getResourceName(objectType), id));
   }
   logger.info("delete({ },{ }) completed", objectType, id);
   standardDao.delete(configurationItem);
}
```

In one embodiment, the response (e.g., HTTP header) can include the HTTP status code. In one embodiment, the response body can include the following elements:

| Response Element | Description |
|---|---|
| Success | True if the API call is successful; false, otherwise. |
| Data | If the API call is successful, this can depend on the operation: Create/update API - the resource (and its associated resources can be returned) in JSON format so that the client can have the ids for the created objects. Get/find API - the resource(s) in JSON format that satisfy the input condition. |
| Total | The total number of root resources. |
| Message | This can contains the error message if the API call failed. |

Sample successful response follows:

```
{
   "success": true,
   "data": [
   {
   "id": "bb3f02be-812e-4500-b4cd-292be253de22"
   "name": "na55-acs1-1-was",
```

-continued

```
    "deviceRole": "acs",
  }]
  "total": 1
}
Sample error response follows:
{
  "success": false,
  "message": "Error message here"
}
```

In one embodiment, API version validator 360 checks to determine that new fields for each resource are only accessible on the API version that they are introduced, and that the fields that are deprecated are not accessible after a particular version. In one embodiment, fields are annotated with a version number with a MinApiVersion and MaxApiVersion to indicate when these attributes/resources are effective. In one embodiment, adding attributes will have a MinApiVersion value of the release when it got added. In one embodiment, deprecating fields are deprecating the old name and adding the new name. In one embodiment, annotations both at the resource and field level. The following is a sample of a domain object with versions on the resource and its fields.

```
@Entity
@Table(name = "CMDB_HOST")
@JsonFilter("Host")
@JsonIdentityInfo(generator = ObjectIdGenerators.UUIDGenerator.class,
property= "@hostJacksonId")
@APIResource(name = "hosts")
@MinApiVersion(1.0)
public class Host extends AuditableConfigurationItem {
    @MinApiVersion(1.0)
    @Column(name = "name")
    private String name;
    @Column(name = "smbiosguid", nullable = false)
    private String smbiosguid;
    @Column(name = "asset_tag", nullable = false)
    private String assetTag;
    @MaxApiVersion(2.0) //field is "deleted" by 2.1
    @Column(name = "serial_number", nullable = false)
    private String serialNumber;
    @MinApiVersion(1.0)
    @MaxApiVersion(2.0)
    @Column(name = "operational_status")
    private String operationalStatus;
    @MinApiVersion(2.1)
    @Column(name = "operational_status")
    private String status
```

In one embodiment, before handling a creation, read or update of a resource and its fields, API version validator 360 validates that the resource and fields are accessible based on the version number provided in the URL. If there is a match, the operation is allowed on the resource/configuration item. In one embodiment, when the resource object is built for a particular API request, these annotations are taken into consideration as well to ensure that the object is compatible with the version that the client is asking for. In one embodiment, this is accomplished using appropriate filtering on the JSON response object.

In one embodiment, API resource cache 365 caches metadata information about one or more resources. When an application starts for the first time, it scans the code (e.g., JAVA®) package to look for resources it could use for the REST API and caches that information. It is then used by the different modules of the system to look up information about the resources. The following are examples of resource details that can be saved in the cache: 1) operations allowed for a resource; 2) mapping of the REST API name of the resource to the actual class that supports that resource (e.g., hosts resource->Host.java); and/or 3) a list of fields/attributes available in the class. Other and/or different resource details can also be stored.

In one embodiment, domain objects/resources 370 can be, for example, JAVA® objects that can be referred to with getter and setter methods. Additional and/or different domain objects/resources can also be supported. In one embodiment, domain objects/resources 370 are made available through the REST API. These classes can contain annotations for both ORM (e.g., Hibernate) 380 and version handling. In one embodiment, API resource cache 365 scans the domain objects with @APIResource and @APISearchable annotations. The following is an example of a domain object/resource:

```
@Entity
@org.hibernate.annotations.Entity(dynamicInsert = true)
@Table(name = "CMDB_HOST", uniqueConstraints =
@UniqueConstraint(columnNames = ("serial_number", "manufacturer")))
@JsonFilter("Host")@JsonIdentityInfo(generator =
ObjectIdGenerators.UUIDGenerator.class, property = "@hostJacksonId")
@APIResource(name = "hosts")
public class Host extends AuditableConfigurationItem {
    @Column(name = "name", nullable = true, unique = true)
    private String name;
    @Column(name = "serial_number", nullable = false)
    private String serialNumber;
    @Column(name = "operational_status", nullable = false)
    private String operationalStatus;
    @OneToOne(fetch = FetchType.EAGER)
    @JoinColumn(name = "cluster_id", nullable = false)
    private Cluster cluster;
    @MinApiVersion(1.01)
    @Column(name = "manufacturer", nullable = false)
    ...
    public String getName( ) {
    return name;
    }
    public void setName(String name) {
    this.name = name;
    }
    ...
```

In one embodiment, repository/data access object (DAO) layer 350 handles requests handled by query model 340 and hands it off to ORM 380 for processing. In one embodiment, the class uses the @Repository annotation in Spring; however, other annotation schemes can be used. The following sample calls can be used within DAO layer 350.

```
@Repository
public class StandardDao implements Dao {
    @Autowired
    @Qualifier("cmsSessionFactory")
    private SessionFactory sessionFactory;
    @Override
    @Transactional(readOlnly = true)
    public List find(QueryModel queryModel) {
        logger.info("find({ }) called");
        Criteria criteria = queryModel.getHibernateCriteria(sessionFactory);
        List list = criteria.list( );
        Logger.info(find( ) complete");
        Return list;
    }
    @Override
    @Transactional
    public void delete(ConfigurationItem configurationItem) {
        logger.info("delete({ }) called", configurationItem);
        sessionFactory.getCurrentSession( ).delete(configurationItem);
        logger.info('delete({ }) completed", configurationItem);
    }
}
```

In one embodiment, HTTP POST can be used to support creation of a top-level resource and its non-top-level resource associations per call. The format of the create call can be, for example:

POST {cms-server}api/{version}/{resource}?<method={delete/update}>

In some implementations, "method" can be used when bulk delete or update is required or by clients who may not be able to perform puts or deletes.

In one embodiment, the fields to be created can be sent as JavaScript Object Notation (JSON) in the request body. The parent resource association in the request and its children resources may be included. For example, for Cluster the request can be POST {cms-server}/api/{version}/cluster With request body as follows:

```
{
  "name": "na7",
  "isDR": false,
  "operationalStatus": "PRE_PRODUCTION",
  "environment": "production",
  "buildType": "new",
  "clusterType": "pod",
  "superpod": {
    "id": "cc3f02be-812e-4500-b4cd-292be253de43",
    "name": "sp7"
  }
}
```

In one embodiment, a successful create response can return a 201 HTTP status code and the body can contain the full JSON object with the new id assigned to it.

```
{
  "success": true,
  "data": [
    {
      "id": "783f02be-812e-4500-b4cd-292be253de43",
      "name": "na7",
      "isDR": false,
      "operationalStatus": "PRE_PRODUCTION",
      "environment": "production",
      "buildType": "new",
      "clusterType": "pod",
      "superpod": {
        "id": "cc3f02be-812e-4500-b4cd-292be253de43",
        "name": "sp7"
      }
    }]
  "total": 1
}
```

In one embodiment, a HTTP PUT can be used to update a top-level resource. Fields can be replaced by the new values passed in. In some implementations, the update request can be preceded by a retrieval of the full and the response can be used as input to the update call. In one embodiment, the format of the update call can be as follows:

PUT {cms-server}/api/{version}/{resource}/{id}

For example, allocating the scratch host a name, role and its pod assignment can involve retrieving the cluster/pod where the host can belong to, retrieving the host information from the previous step, changing the host name, role and cluster association, and calling update API with the host object built from the previous step.

A sample update API call is shown below:

```
PUT {cms-server}/api/{version}/host
  with request body of
  {
    "id": "bb3f02be-812e-4500-b4cd-292be253de43",
    "name": "na55-acs1-1-was",
```

-continued

```
    "smbiosguid": "123",
    "assetTag": "456345",
    "provisioningStatus": "inventory complete",
    "deviceType": "app",
    "deviceRole": "acs",
    "make": "Dell",
    "model": "R620",
    "numberOfLocalDisk": 2,
    "cluster": {
      "name": "na55",
      "id": "aa3f02be-812e-4500-b4cd-292be253de43"
    },
    "networkInterfaces": [
      {
        "id": "993f02be-812e-4500-b4cd-292be253de12",
        "hardwareAddress": "aa:bb:11:22:33:01",
        "logicalName": "eth0"
      },
      {
        "id": "993f02be-812e-4500-b4cd-292be253de13",
        "hardwareAddress": "aa:bb:11:22:33:02",
        "logicalName": "eth1"
      },
      {
        "id": "993f02be-812e-4500-b4cd-292be253de14",
        "hardwareAddress": "aa:bb:11:22:33:03",
        "logicalName": "eth2"
      },
      {
        "id": "993f02be-812e-4500-b4cd-292be253de15",
        "hardwareAddress": "aa:bb:11:22:33:04",
        "logicalName": "eth3"
      },
      {
        "id": "993f02be-812e-4500-b4cd-292be253de16",
        "hardwareAddress": "aa:bb:11:22:33:05",
        "logicalName": "eth4"
      },
      {
        "id": "993f02be-812e-4500-b4cd-292be253de17",
        "hardwareAddress": "aa:bb:11:22:33:06",
        "logicalName": "eth5"
      },
      {
        "id": "993f02be-812e-4500-b4cd-292be253de18",
        "hardwareAddress": "aa:bb:11:22:33:07",
        "logicalName": "eth6"
      },
      {
        "id": "993f02be-812e-4500-b4cd-292be253de19",
        "hardwareAddress": "aa:bb:11:22:33:08",
        "logicalName": "eth7"
      },
      {
        "id": "993f02be-812e-4500-b4cd-292be253de20",
        "hardwareAddress": "aa:bb:11:22:33:09",
        "logicalName": "eth8"
      }
    ]
}
```

In one embodiment, for concurrent updates, optimistic locking through the use of version number can be used.

In one embodiment, HTTP DELETE can be used for deleting a single resource. The format of the delete call can be as follows:

DELETE {cms-server}/api/{version}/{resource}/{id}

In some implementations, cascading deletes based on top-level object can be supported.

In one embodiment, for read API, the technology disclosed can support find and get functionality. Both of these can be implemented as HTTP GET methods. By default, all of its non-top-level children associations can be returned. If users need its parent association, users need to include that parent in the expand parameter which is explained below. If users need to limit the response with only certain properties, users need to use the field parameter below.

In one embodiment, top-level object reads can return the full object hierarchy that can include its non-top-level objects. Non-top-level object reads can return just that resource.

In one embodiment, Get is used when the ID of the resource is known and the goal is simply to return that resource. The get call can include the resource name and the ID of the resource to be retrieved. The format of the get call can be as follows:

GET   {cms-server}/api/{version}/{resource}/{id}? <fields={field1, field2 . . . ,fieldn}>& <expand={fieldObject1,fieldObject2.fieldObject9, . . . , fieldObjectN}

An example call can be

GET   {cms-server}/api/{version}/host/bb3f02be-812e-450

In some implementations, the supported parameters can include "fields" and "expand." Fields can represent the limited list of properties that can be returned for a resource. If no field parameter is specified, then all properties of that resource can be returned. The "fields" can be filtered at resource-level, so if cluster name is used in "fields", no matter where in object hierarchy cluster comes, it can be returned with name only.

In one embodiment, Expand can include the names of the associated resources that need to be expanded. If no expand parameter is specified, then the associated resources may not be included in the response. A value of "none" means no association (children or parent) is to be included. This is useful if users want to capture the properties of a resource and can result in higher performance.

In some implementations, "find" can be used to do more generic queries and support cross table selection criteria as well as returning nested objects. By default, all of its non-top-level children associations can be returned. If users need its parent association, users need to include that parent in the expand parameter which is explained below. If users need to limit the response with only certain properties, users need to use the field parameter below.

The optional parameters that can be supported on a find can be, for example:

start—sets the position of the first row to retrieve to support pagination limit—sets the maximum number of records to return fields—the limited list of properties that can be returned for the resource. If no field parameter is specified then all properties of that resource can be returned. Including fields incurs additional cost on the CMS server side. The fields can be filtered at resource-level, so if cluster.name is used in fields, no matter where in object hierarchy cluster comes, it can be returned with name only.

search criteria—name-value pairs that represent the field to be searched and the value the field. Note that the field to be searched is of the format {associated_resource.}field where associated_resource is not required if the field resides in the resource. This is basically to allow the query of an object graph to filter the result set.

For example, the following search criteria can exist for a resource host cluster.name=na1,application.name=core which can ask for host resources that can be for cluster na1 and have application core as discovered through tables joined to the host object.

expand—the names of the associated resources that need to be expanded. If no expand parameter is specified, then the associated resources may not be included in the response. Having "expand" can incur additional cost on the CMS server side. The names of the potentially nested objects that can be returned on the response. A value of "none" means no association (children or parent) can be included. This is useful if users want to capture the properties of a resource and can result in higher performance.

For example the following field specification can exist for a get of resource Superpod expand=cluster,cluster.host The response to this call can return the Superpod as the main resource and can include the cluster, and host resources associated to that Superpod that met the selection criteria.

If users want to find Superpod with name="abcd".

URL: /api/{version}/cms/superpod?name=abcd

This can return ["id":"abcd", "name":"abcd"]. Superpod has associated resources of cluster but they may not be returned because it is not included in the expand parameter.

If users want to get clusters within a Superpod,

URL:   /api/{version}/superpod?name=abcd&expand=clusters

This can return superpod with the cluster resource.

```
{
    "success": true,
    "data": [
    {
    "name": "sp6",
    "id": "cc3f02be-812e-4500-b4cd-292be253de43"
    "clusters": [
    {
    "name": "na7",
    "isDR": false,
    "operationalStatus": "PRE_PRODUCTION",
    "environment": "production",
    "buildType": "new",
    "clusterType": "pod"
    }
    ]
    }]
    "total": 1
}
```

In one embodiment, the APIs can have a version number as part of the URL. The clients need to specifically indicate which version they want to use.

{cms-server}/api/{version}/{resource}

If the APIs change drastically to another kind, the technology disclosed can change the URL path. For example, if users switch to an RPC type of API, the technology disclosed can update the API URL to be:

{cms-server}/rpc-api/{version}/{resource}

Security can be based on mutual authentication via TLS. In some implementations, the technology disclosed can also investigate supporting Kerberos to allow for users to authenticate for cases where the updates to CMS can be done through scripts or a user interface (UI).

In one embodiment, authenticated users can query all tables. For updates the following authorization models can be used

| Resources | Authorization Strategy |
| --- | --- |
| Data center/pod/super pod | authorized through LDAP or Kerberos |
| Application tables (future requirement) | LDAP or Kerberos |
| Inventory assets | if authenticated through certificate then updates automatically allowed. |

In some implementations, client libraries can be provided for Java and Perl. ConfigurationItem is the base object that all other objects, such as host, application, etc, extend. An instance of a top-level object can be passed in to these calls and the appropriate action can be taken. Note that for update, a get call must be issued in advance.

```
public void create(ConfigurationItem configItem);
public void delete(ConfigurationItem configItem) or public void
    delete(String id);
public void update(ConfigurationItem configItem);
```

For gets and finds, there can be a GetParams object that can be populated with the following fields to inform how the get can be done. The fields can be

```
List<String>fields
List<String>expandObjects
List<NameValuePair>searchCriteria
```

In some implementations, a get call for the resources can be made as follows:

```
public Cluster getCluster(String id, GetParams params);
public Host getHost(String id, GetParams params);
```

In some implementations, a find call for the resources can be made as follows:

```
public List<Cluster>findCluster(GetParams params);
public List<Host>findHost(GetParams params);
```

Software Components and Layers can include jetty, MVC, controller layer, service layer. These are specific examples as illustrated in FIG. 1 and other components can also be used. Jetty is the application server that powers the CMS APIs. It handles the HTTP requests and forwards it to Spring's Dispatcher servlet.

In one embodiment, users can utilize the Spring MVC framework to dispatch requests to the controllers.

Controller Layer—This layer contains all the classes with a controller role. These classes use Spring's @Controller annotation. By using this annotation, user can inform Spring which service interfaces need to be invoked for certain URL's. This layer takes care of processing the HTTP input parameters and request body. Spring auto-serializes the response in the intended output format or media type.

Service Layer—This layer contains all the classes with Spring's @Service annotation. Users put the business logic in this layer.

Repository/DAO Layer—This layer contains the classes with Spring's @Repository annotation to indicate that these can be the data access objects. This is where users use Hibernate to connect and make DB calls.

Hibernate is an object-relational mapping (ORM) tool to map the domain objects (POJOs) to the database tables and from Java data types to SQL data types. It supports optimistic locking automatically with the use of version numbers that users added in our domain objects. Users rely on Hibernate for the connection pool mechanism and actual DB calls. Users plan to use some of its annotations as well to indicate whether fields can be inserted, updated, etc.

Other implementations may include a non-transitory computer readable storage medium storing instructions executable by a processor to perform a method as described above. Yet another implementation may include a system including memory and one or more processors operable to execute instructions, stored in the memory, to perform a method as described above.

Figure 4:
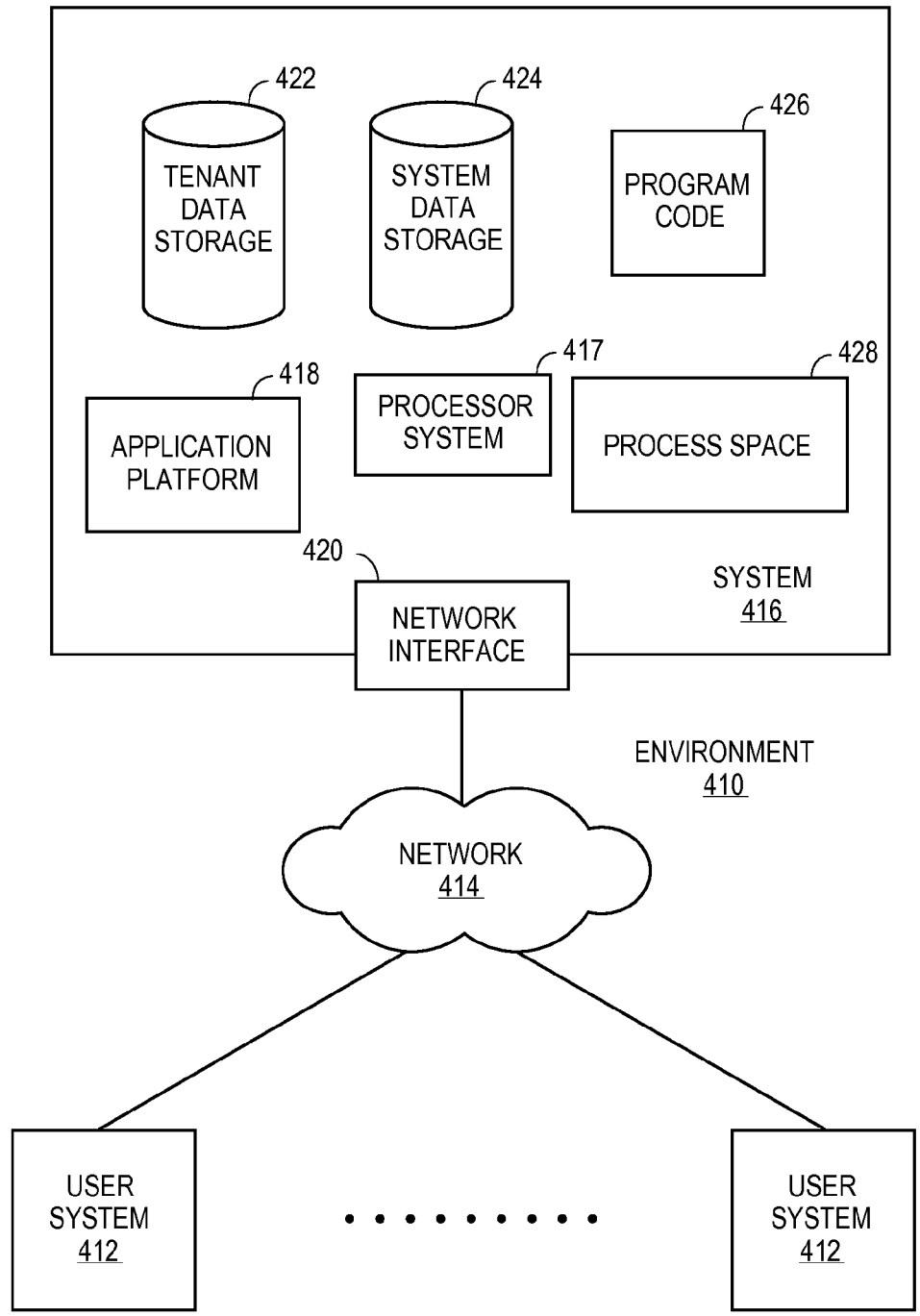
FIG. 4 illustrates a block diagram of an environment where an on-demand database service might be used.

FIG. 4 illustrates a block diagram of an environment 410 wherein an on-demand database service might be used. Environment 410 may include user systems 412, network 414, system 416, processor system 417, application platform 418, network interface 420, tenant data storage 422, system data storage 424, program code 426, and process space 428. In other embodiments, environment 410 may not have all of the components listed and/or may have other elements instead of, or in addition to, those listed above.

Environment 410 is an environment in which an on-demand database service exists. User system 412 may be any machine or system that is used by a user to access a database user system. For example, any of user systems 412 can be a handheld computing device, a mobile phone, a laptop computer, a work station, and/or a network of computing devices. As illustrated in FIG. 4 (and in more detail in FIG. 5) user systems 412 might interact via a network 414 with an on-demand database service, which is system 416.

An on-demand database service, such as system 416, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 416" and "system 416" will be used interchangeably herein.

A database image may include one or more database objects. A relational database management system (RDMS) or the equivalent may execute storage and retrieval of information against the database object(s). Application platform 418 may be a framework that allows the applications of system 416 to run, such as the hardware and/or software, e.g., the operating system. In an embodiment, on-demand database service 416 may include an application platform 418 that enables creation, managing and executing one or more applications developed by the provider of the on-demand database service, users accessing the on-demand database service via user systems 412, or third party application developers accessing the on-demand database service via user systems 412.

The users of user systems 412 may differ in their respective capacities, and the capacity of a particular user system 412 might be entirely determined by permissions (permission levels) for the current user. For example, where a salesperson is using a particular user system 412 to interact with system 416, that user system has the capacities allotted to that salesperson. However, while an administrator is using that user system to interact with system 416, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 414 is any network or combination of networks of devices that communicate with one another. For example, network 414 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that the present invention might use are not so limited, although TCP/IP is a frequently implemented protocol.

User systems 412 might communicate with system 416 using TCP/IP and, at a higher network level, use other common Internet protocols to communicate, such as HTTP, FTP, AFS, WAP, etc. In an example where HTTP is used, user system 412 might include an HTTP client commonly referred to as a "browser" for sending and receiving HTTP messages to and from an HTTP server at system 416. Such an HTTP server might be implemented as the sole network interface between system 416 and network 414, but other techniques might be used as well or instead. In some implementations, the interface between system 416 and network 414 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 416, shown in FIG. 4, implements a web-based customer relationship management (CRM) system. For example, in one embodiment, system 416 includes application servers configured to implement and execute CRM software applications as well as provide related data, code, forms, webpages and other information to and from user systems 412 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared.

In certain embodiments, system 416 implements applications other than, or in addition to, a CRM application. For example, system 416 may provide tenant access to multiple hosted (standard and custom) applications, including a CRM application. User (or third party developer) applications, which may or may not include CRM, may be supported by the application platform 418, which manages creation, storage of the applications into one or more database objects and executing of the applications in a virtual machine in the process space of the system 416.

One arrangement for elements of system 416 is shown in FIG. 4, including a network interface 420, application platform 418, tenant data storage 422 for tenant data 423, system data storage 424 for system data 425 accessible to system 416 and possibly multiple tenants, program code 426 for implementing various functions of system 416, and a process space 428 for executing MTS system processes and tenant-specific processes, such as running applications as part of an application hosting service. Additional processes that may execute on system 416 include database indexing processes.

Several elements in the system shown in FIG. 4 include conventional, well-known elements that are explained only briefly here. For example, each user system 412 could include a desktop personal computer, workstation, laptop, PDA, cell phone, or any wireless access protocol (WAP) enabled device or any other computing device capable of interfacing directly or indirectly to the Internet or other network connection. User system 412 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 412 to access, process and view information, pages and applications available to it from system 416 over network 414.

Each user system 412 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 416 or other systems or servers. For example, the user interface device can be used to access data and applications hosted by system 416, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 412 and all of its components are operator configurable using applications, such as a browser, including computer code run using a central processing unit such as an Intel Pentium® processor or the like. Similarly, system 416 (and additional instances of an MTS, where more than one is present) and all of their components might be operator configurable using application(s) including computer code to run using a central processing unit such as processor system 417, which may include an Intel Pentium® processor or the like, and/or multiple processor units.

A computer program product embodiment includes a machine-readable storage medium (media) having instructions stored thereon/in which can be used to program a computer to perform any of the processes of the embodiments described herein. Computer code for operating and configuring system 416 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data.

Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments of the present invention can be implemented in any programming language that can be executed on a client system and/or server or server system such as, for example, C, C++, HTML, any other markup language, Java™ JavaScript, ActiveX, any other scripting language, such as VBScript, and many other programming languages as are well known may be used. (Java™ is a trademark of Sun Microsystems, Inc.).

According to one embodiment, each system 416 is configured to provide webpages, forms, applications, data and media content to user (client) systems 412 to support the access by user systems 412 as tenants of system 416. As such, system 416 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B).

As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

Figure 5:
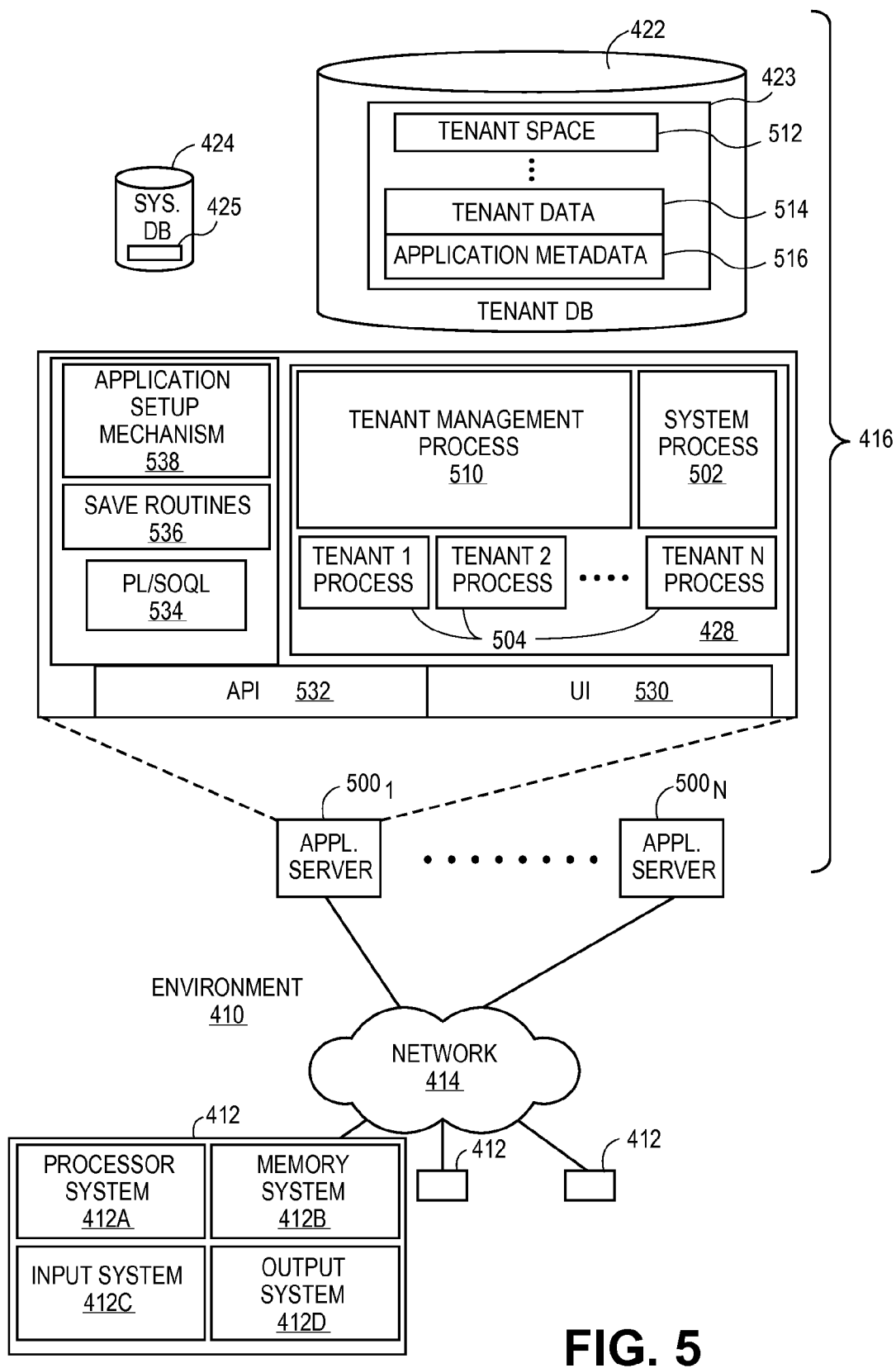
FIG. 5 illustrates a block diagram of an environment where an on-demand database service might be used.

FIG. 5 also illustrates environment 410. However, in FIG. 5 elements of system 416 and various interconnections in an embodiment are further illustrated. FIG. 5 shows that user system 412 may include processor system 412A, memory system 412B, input system 412C, and output system 412D. FIG. 5 shows network 414 and system 416. FIG. 5 also shows that system 416 may include tenant data storage 422, tenant data 423, system data storage 424, system data 425, User Interface (UI) 530, Application Program Interface (API) 532, PL/SOQL 534, save routines 536, application setup mechanism 538, applications servers $500_1$-$500_N$, system process space 502, tenant process spaces 504, tenant management process space 510, tenant storage space 512, tenant data 514, and application metadata 516. In other embodiments, environment 410 may not have the same elements as those listed above and/or may have other elements instead of, or in addition to, those listed above.

User system 412, network 414, system 416, tenant data storage 422, and system data storage 424 were discussed above in FIG. 4. Regarding user system 412, processor system 412A may be any combination of one or more processors. Memory system 412B may be any combination of one or more memory devices, short term, and/or long term memory. Input system 412C may be any combination of input devices, such as one or more keyboards, mice, trackballs, scanners, cameras, and/or interfaces to networks. Output system 412D may be any combination of output devices, such as one or more monitors, printers, and/or interfaces to networks.

As shown by FIG. 5, system 416 may include a network interface 420 (of FIG. 4) implemented as a set of HTTP application servers 500, an application platform 418, tenant data storage 422, and system data storage 424. Also shown is system process space 502, including individual tenant process spaces 504 and a tenant management process space 510. Each application server 500 may be configured to tenant data storage 422 and the tenant data 423 therein, and system data storage 424 and the system data 425 therein to serve requests of user systems 412. The tenant data 423 might be divided into individual tenant storage spaces 512, which can be either a physical arrangement and/or a logical arrangement of data.

Within each tenant storage space 512, tenant data 514 and application metadata 516 might be similarly allocated for each user. For example, a copy of a user's most recently used (MRU) items might be stored to tenant data 514. Similarly, a copy of MRU items for an entire organization that is a tenant might be stored to tenant storage space 512. A UI 530 provides a user interface and an API 532 provides an application programmer interface to system 416 resident processes to users and/or developers at user systems 412. The tenant data and the system data may be stored in various databases, such as one or more Oracle' databases.

Application platform 418 includes an application setup mechanism 538 that supports application developers' creation and management of applications, which may be saved as metadata into tenant data storage 422 by save routines 536 for execution by subscribers as one or more tenant process spaces 504 managed by tenant management process 510 for example. Invocations to such applications may be coded using PL/SOQL 534 that provides a programming language style interface extension to API 532.

A detailed description of some PL/SOQL language embodiments is discussed in commonly owned co-pending U.S. Provisional Patent Application 60/828,192 entitled, PROGRAMMING LANGUAGE METHOD AND SYSTEM FOR EXTENDING APIS TO EXECUTE IN CONJUNCTION WITH DATABASE APIS, by Craig Weissman, filed Oct. 4, 2006, which is incorporated in its entirety herein for all purposes. Invocations to applications may be detected by one or more system processes, which manages retrieving application metadata 516 for the subscriber making the invocation and executing the metadata as an application in a virtual machine.

Each application server 500 may be communicably coupled to database systems, e.g., having access to system data 425 and tenant data 423, via a different network connection. For example, one application server $500_1$ might be coupled via the network 414 (e.g., the Internet), another application server $500_{N-1}$ might be coupled via a direct network link, and another application server $500_N$ might be coupled by yet a different network connection. Transfer Control Protocol and Internet Protocol (TCP/IP) are typical protocols for communicating between application servers 500 and the database system. However, it will be apparent to one skilled in the art that other transport protocols may be used to optimize the system depending on the network interconnect used.

In certain embodiments, each application server 500 is configured to handle requests for any user associated with any organization that is a tenant. Because it is desirable to be able to add and remove application servers from the server pool at any time for any reason, there is preferably no server affinity for a user and/or organization to a specific application server 500. In one embodiment, therefore, an interface system implementing a load balancing function (e.g., an F5 Big-IP load balancer) is communicably coupled between the application servers 500 and the user systems 412 to distribute requests to the application servers 500.

In one embodiment, the load balancer uses a least connections algorithm to route user requests to the application servers 500. Other examples of load balancing algorithms, such as round robin and observed response time, also can be used. For example, in certain embodiments, three consecutive requests from the same user could hit three different application servers 500, and three requests from different users could hit the same application server 500. In this manner, system 416 is multi-tenant, wherein system 416 handles storage of, and access to, different objects, data and applications across disparate users and organizations.

As an example of storage, one tenant might be a company that employs a sales force where each salesperson uses system 416 to manage their sales process. Thus, a user might maintain contact data, leads data, customer follow-up data, performance data, goals and progress data, etc., all applicable to that user's personal sales process (e.g., in tenant data storage 422). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 416 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 416 might also maintain system level data usable by multiple tenants or other data. Such system level data might include industry reports, news, postings, and the like that are sharable among tenants.

In certain embodiments, user systems 412 (which may be client systems) communicate with application servers 500 to request and update system-level and tenant-level data from system 416 that may require sending one or more queries to tenant data storage 422 and/or system data storage 424. System 416 (e.g., an application server 500 in system 416) automatically generates one or more SQL statements (e.g., one or more SQL queries) that are designed to access the desired information. System data storage 424 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects according to the present invention. It should be understood that "table" and "object" may be used interchangeably herein. Each table generally contains one or more data categories logically arranged as columns or fields in a viewable schema. Each row or record of a table contains an instance of data for each category defined by the fields.

For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. patent application Ser. No. 10/817,161, filed Apr. 2, 2004, entitled "Custom Entities and Fields in a Multi-Tenant Database System", and which is hereby incorporated herein by reference, teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

While the invention has been described in terms of several embodiments, those skilled in the art will recognize that the invention is not limited to the embodiments described, but can be practiced with modification and alteration within the spirit and scope of the appended claims. The description is thus to be regarded as illustrative instead of limiting.

What is claimed is:

1. A method for providing dynamic configuration hierarchies, the method comprising:
   automatically providing, with an application server, annotations indicating version information for a resource provided by a server computing device;
   scanning class metadata for the resource including at least the version information by checking to determine that new fields for each resource are only accessible via an application program interface (API) version that corresponds to introduction of the new fields, and that fields that are deprecated are not accessible via API versions after a designated API version;
   storing the class metadata in a repository;
   validating version configuration, with the application server, using the class metadata from the repository in response to receiving a request to access the resource.

2. The method of claim 1 wherein the class metadata is scanned through a representational state transfer (REST) style application programming interface (API) that is generic for multiple resource types.

3. The method of claim 1 wherein the application server and the server computing device are both part of an on-demand services environment.

4. The method of claim 3 wherein the on-demand services environment comprises a multitenant database environment.

5. The method of claim 1 wherein the scanning, storing and validating is utilized for all domain objects defined in a scan directory.

6. The method of claim 2 wherein different configurations can have different version requirements and the different configurations are all scanned, stored and validated using the REST API.

7. A system having one or more hardware processing components configured to have access to at least one memory device, the system comprising:
- a controller, provided by the one or more hardware processing components, to handle method for a supported resource, the supported resource provided by a server computing device, the controller to validate requests to access the supported resource;
- a service component, provided by the one or more hardware processing components, communicatively coupled with the controller, the service component to perform operations on class metadata for the supported resource including at least the version information;
- a version validator component, provided by the one or more hardware processing components, communicatively coupled with the controller and the service component to ensure that new fields for each resource are only accessible for selected versions of the resource by checking to determine that the new fields for each resource are only accessible via an application program interface (API) version that corresponds to introduction of the new fields, and that fields that are deprecated are not accessible via API versions after a designated API version;
- a resource repository within the at least one memory device communicatively coupled with the service component and the controller to store the class metadata;
- the controller, provided by the one or more hardware processing components, to scan class metadata for the selected resource including at least the version information, to cause the class metadata to be stored in the resource repository, and to validate version configuration using the class metadata from the repository in response to receiving a request to access the supported resource.

8. The system of claim 7 wherein the class metadata is scanned through a representational state transfer (REST) style application programming interface (API) that is generic for multiple resource types.

9. The system of claim 7 wherein the controller, service component, version validator and resource repository are all part of an on-demand services environment.

10. The system of claim 9 wherein the on-demand services environment comprises a multitenant database environment.

11. The system of claim 7 wherein the scanning, storing and validating is utilized for all domain objects defined in a scan directory.

12. The system of claim 8 wherein different configurations can have different version requirements and the different configurations are all scanned, stored and validated using the REST API.

13. A non-transitory computer-readable medium having instruction there on that, when executed, are configurable to for provide dynamic configuration hierarchies by:
- automatically providing, with an application server, annotations indicating version information for a resource provided by a server computing device;
- scanning class metadata for the resource including at least the version information by checking to determine that new fields for each resource are only accessible via an application program interface (API) version that corresponds to introduction of the new fields, and that fields that are deprecated are not accessible via API versions after a designated API version;
- storing the class metadata in a repository;
- validating version configuration, with the application server, using the class metadata from the repository in response to receiving a request to access the resource.

14. The computer-readable medium of claim 13 wherein the class metadata is scanned through a representational state transfer (REST) style application programming interface (API) that is generic for multiple resource types.

15. The computer-readable medium of claim 13 wherein the application server and the server computing device are both part of an on-demand services environment.

16. The computer-readable medium of claim 15 wherein the on-demand services environment comprises a multitenant database environment.

17. The computer-readable medium of claim 13 wherein the scanning, storing and validating is utilized for all domain objects defined in a scan directory.

18. The computer-readable medium of claim 14 wherein different configurations can have different version requirements and the different configurations are all scanned, stored and validated using the REST API.

* * * * *